United States Patent
Blazic

(10) Patent No.: US 8,136,894 B2
(45) Date of Patent: Mar. 20, 2012

(54) SHOCK AND VIBRATION ISOLATION FOR AIRCRAFT BRAKE CONTROL VALVE

(75) Inventor: Ernest Blazic, Agoura Hills, CA (US)

(73) Assignee: Hydro-Aire, Inc., a Subsidiary of Crane Co., Burbank, CA (US)

( * ) Notice: Subject to any disclaimer, the term of this patent is extended or adjusted under 35 U.S.C. 154(b) by 462 days.

(21) Appl. No.: 12/422,923

(22) Filed: Apr. 13, 2009

(65) Prior Publication Data

US 2010/0258987 A1    Oct. 14, 2010

(51) Int. Cl.
*B60T 8/36* (2006.01)

(52) U.S. Cl. ............... 303/119.2; 303/119.3; 267/293; 248/635; 248/638

(58) Field of Classification Search ........... 303/119.2, 303/119.3; 267/292, 293, 141, 153; 248/634, 248/635, 636, 637, 638; 307/9.1, 10.1
See application file for complete search history.

(56) References Cited

U.S. PATENT DOCUMENTS

| | | |
|---|---|---|
| 2,477,972 A | 8/1945 | Efromson et al. |
| 2,389,562 A * | 11/1945 | Storch .................... 248/613 |
| 2,616,641 A | 5/1946 | Gagen |
| 2,658,710 A | 5/1950 | Titus |
| 2,894,711 A | 5/1956 | Wingard et al. |
| 3,245,727 A | 8/1962 | Anderson et al. |
| 4,738,435 A | 4/1988 | Flower et al. |
| 5,110,081 A * | 5/1992 | Lang, Jr. ................ 248/635 |
| 5,255,764 A | 10/1993 | Kurabayashi |
| 5,558,191 A | 9/1996 | Lai |
| 6,059,503 A * | 5/2000 | Johnson ................. 411/353 |
| 6,472,769 B1 * | 10/2002 | Long et al. .............. 307/9.1 |
| 6,755,205 B1 | 6/2004 | Hoemke |
| 7,398,143 B2 | 7/2008 | Stothers |
| 7,552,902 B2 * | 6/2009 | Tsuge ..................... 248/638 |

FOREIGN PATENT DOCUMENTS

JP    363083420 A * 4/1988

\* cited by examiner

*Primary Examiner* — Pamela Rodriguez
(74) *Attorney, Agent, or Firm* — Fulwider Patton LLP

(57) ABSTRACT

The shock and vibration isolation system for hard mounting of a manifold of a brake control valve protects the brake control valve manifold from shock and vibration by incorporation of shock and vibration isolators in mounting feet of the manifold. The shock and vibration isolators have a pre-selected natural frequency chosen to protect components of the brake control valve damaging shock and vibration. The shock and vibration isolators each include a silicone rubber insert portion, a first outer sheath secured about a first end of the silicone rubber insert portion, a second outer sheath member secured about a second end of the silicone rubber insert portion, with a gap between the first and second outer sheaths.

13 Claims, 3 Drawing Sheets

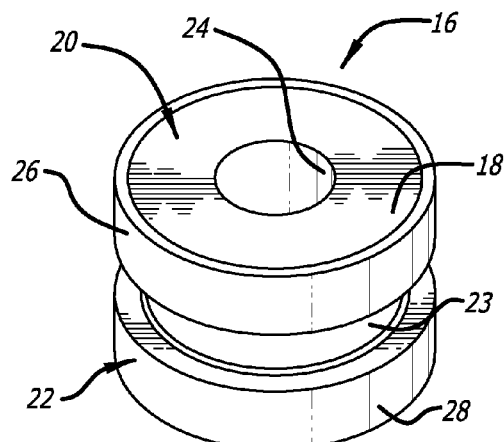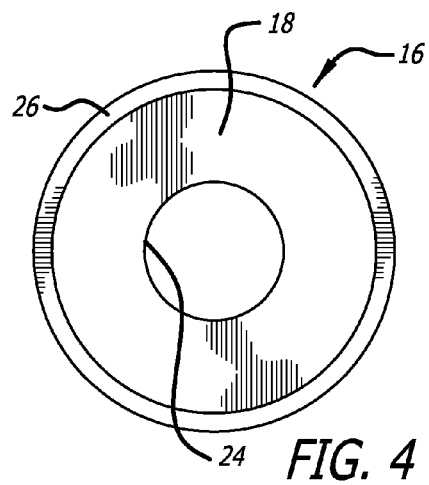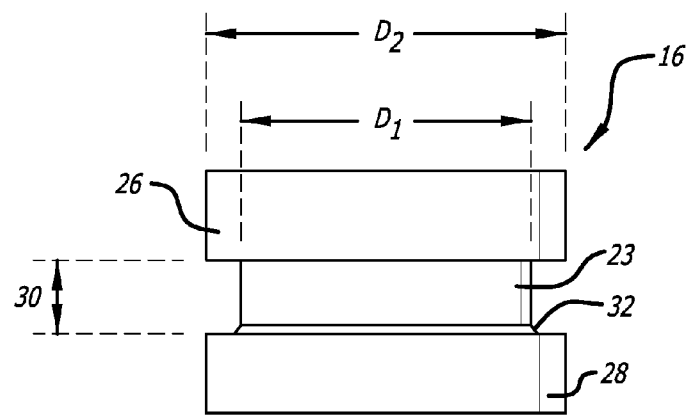

SHOCK AND VIBRATION ISOLATION FOR AIRCRAFT BRAKE CONTROL VALVE

BACKGROUND

This invention relates generally to shock and vibration isolation for aircraft brake control valves, and more particularly relates to improved mounting of an electro-hydraulic brake control valve that incorporates a shock and vibration isolation system integrated into the brake control manifold to isolate the valve assembly from the undesirable effects of aircraft shock/vibration and structural loads generated at the manifold mounting interface.

Conventional aircraft brake control valves are typically hard mounted by being bolted or otherwise rigidly secured by fasteners to a structural part or framework of the aircraft. However, some modern aircraft designs produce more severe random vibration environments than have been previously experienced that adversely affect the functioning of such hard mounted aircraft brake control valves. The problem is more acute with brake-by-wire aircraft brake control valves, because the valves are typically operational for all braking functions, and are not just operational during a skid event.

For example, one type of brake control valve uses a pressure control valve with a flapper nozzle first stage that incorporates an armature that is essentially an undamped spring with a natural frequency in the 300 to 500 Hz range, depending on the armature spring rate. Vibration profiles at a brake control valve mounting locations almost always contain this frequency, so that vibrations in this range will result in some degree of damage to the flapper nozzle as a result of motion of the undamped armature at its resonant frequency that can result in unsatisfactory performance or even failure of the brake control valves.

One known type of active/passive damping apparatus for large structures which includes a passive type damping mechanism to be mounted on the structure, including an added mass, spring, and dampener. Hydraulic cylinders are mounted on the structure and connected to the added mass, with an electro-hydraulic servo mechanism to switch the hydraulic cylinders between passive and active type operation, and a control unit for switching the electro-hydraulic servo mechanism between passive and active type operation in response to the velocity and displacement of the added mass as well as the velocity of the structure.

Another type of active vibration absorber is known for absorbing vibrations in a member. An inertial mass is mounted on the member, and a force actuator applies a force between the inertial mass and the member, and resonance of the active vibration absorber is damped. A first sensor provides a first signal indicative of at least one movement and/or stress related parameter for the member, and a second sensor provides a second signal indicative of a reaction of the inertial mass. A control unit is provided for controlling the force actuator arrangement using the first signal and the second signal.

A tuned mass damper is also known for damping dynamic response in a primary structure in one, two, or three dimensions. The tuned mass damper includes a secondary mass, and a spring and a viscoelastic element, with the spring and viscoelastic element interposed between the primary structure and the secondary mass.

A method is also known for stabilizing a nozzle flapper valve from oscillating, by adding an inertia tube to the flow path of the flapper valve nozzle, to effectively produce a stabilizing pressure force on the flapper at its natural frequency.

It would be desirable to provide a shock and vibration isolation mounting system for an aircraft brake control valve to allow the aircraft brake control valve to be mounted in environments that are often too severe for conventional hard mounted valve mounting arrangements. For example, it would be desirable to provide such a shock and vibration isolation mounting system to allow mounting of an aircraft brake control valve in a wheel well or near or on landing gear, due to their close proximity to brake pistons, allowing the use of shorter length hydraulic lines to provide faster system response and better system performance.

It would be desirable if brake control valve reliability can be improved at conventional mounting locations where hard mounting of brake control valves has previously been used. It would also be desirable to provide a shock and vibration isolation mounting system that will allow the utilization of aircraft brake control valves having a less rigid valve structure as a result of lower stresses at the aircraft mounting interface, to provide weight savings in the mounting of brake control valves. In addition, it would be desirable to provide a shock and vibration isolation mounting system that will allow for brake control electronics that are typically isolated from shock and vibration to be co-located on shock and vibration isolated brake control valves to provide for improved signal processing and signal integrity due to close proximity of brake control electronics to a brake control valve and a wheel speed sensor. The present invention addresses these and other needs.

SUMMARY OF THE INVENTION

Briefly, and in general terms, the present invention provides a system for hard mounting of a manifold of a brake control valve by incorporation of shock and vibration isolators in the mounting feet of the manifold of the brake control valve, wherein the shock and vibration isolators have a preselected, predetermined natural frequency operative to protect components of the brake control valve from random vibration and to avoid so called "gun fire" sinusoidal frequencies of high amplitude, high pressure pulses associated with flapper valve oscillation in response to harmonic resonance that can damage components of the brake control valve. The shock and vibration isolation mounting system of the invention allows the manifold of an aircraft brake control valve to be mounted in severe environments, such as in an aircraft wheel well, or on or near landing gear. The brake control valve shock and vibration isolation mounting system also allows for brake control electronics to be co-located on a shock and vibration isolated brake control valve manifold to provide for improved signal processing and signal integrity.

Accordingly, the present invention provides for a brake control valve shock and vibration isolation mounting system by incorporating shock and vibration isolators in mounting feet of an aircraft brake control valve manifold. The shock and vibration isolators have a natural frequency selected to protect components of a brake control valve from random vibration and to avoid gun fire sinusoidal frequencies that can otherwise damage components of the brake control valve. In particular, the natural frequency of the shock and vibration isolators is predetermined to be in a range to protect a flapper nozzle of a brake control valve from random vibration and to avoid gun fire sinusoidal frequencies, and is preferably above or below the natural frequency range of 300 to 500 Hz of the flapper nozzle of the brake control valve. The mounting feet of the brake control valve manifold have mounting apertures configured to receive and retain generally tubular shock and vibration isolators. Each of the generally tubular shock and vibration isolators have a central aperture for receiving a bolt or other type of fastener for hard mounting of the mounting feet of the brake control valve manifold to a structural part or framework of the aircraft. The generally tubular shock and vibration isolators of the invention each include a silicone rubber tubular insert portion defining the central aperture, a first generally tubular or annular outer sheath member secured about a first end of the silicone rubber tubular insert portion, and a second generally tubular or annular outer sheath member secured about a second end of the silicone rubber tubular insert portion.

The first and second generally tubular or annular outer sheath members are typically made of metal, such as stainless steel, for example, and are spaced apart by a gap. The outer diameter of the silicone rubber tubular insert portion is also preferably dimensioned such that a bolt or other type of fastener placed through the central aperture of the silicone rubber tubular insert portion will be spaced apart from the first and second generally tubular or annular outer sheath members, so that vibrations transmitted through the bolt or other type of fastener from the aircraft structural part or framework will not be transmitted directly to the first and second generally tubular or annular outer sheath members. The gap by which the first and second generally tubular or annular outer sheath members are spaced apart further permits the silicone rubber tubular insert portion to expand radially outwardly through the gap between the first and second generally tubular or annular outer sheath members as the bolt or other type of fastener is tightened in hard mounting of the mounting feet of the brake control valve manifold to a structural part or framework of the aircraft. The radially outward expansion of the silicone rubber tubular insert portion is limited by the first and second generally tubular or annular outer sheath members and the mounting apertures of the mounting feet of the aircraft brake control valve manifold, so that vibrations transmitted through the bolt or other type of fastener from the aircraft structural part or framework can only be transmitted through the silicone rubber tubular insert portions, and are damped due to the pre-selected, predetermined natural frequency of the shock and vibration isolators.

These and other features and advantages of the present invention will become more apparent from the following detailed description of the invention in conjunction with the accompanying drawings, which illustrate, by way of example, the operation of the invention.

BRIEF DESCRIPTION OF THE DRAWINGS

FIG. 3 is a perspective view of one of the shock and vibration isolators of FIG. 1, according to the present invention.

FIG. 4 is a top plan view of the shock and vibration isolator of FIG. 3.

FIG. 5 is a side elevational view of the shock and vibration isolator of FIG. 3.

DETAILED DESCRIPTION OF THE PREFERRED EMBODIMENTS

Figure 1:
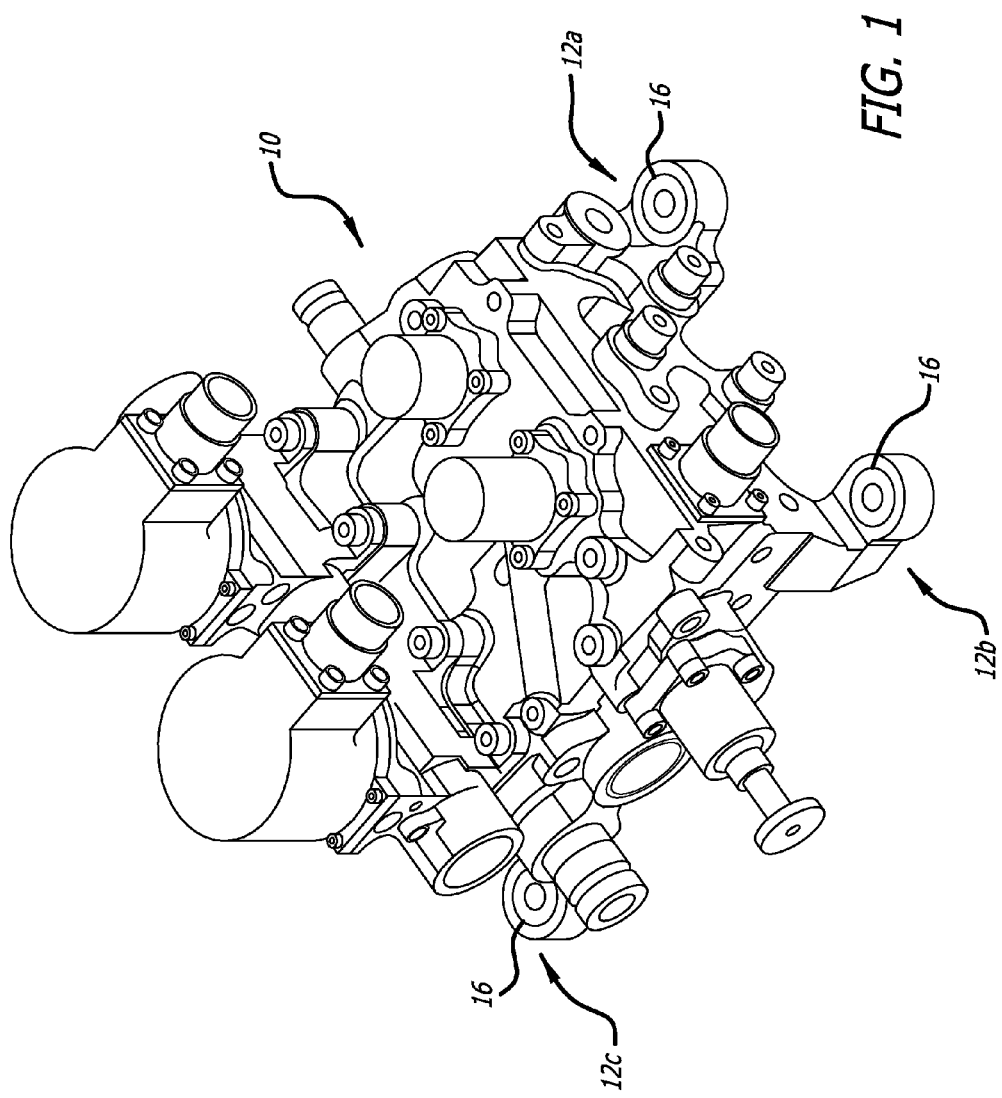
FIG. 1 is a perspective view of an aircraft brake control valve manifold with shock and vibration isolators installed in the mounting feet of the aircraft brake control valve manifold, according to the present invention.
Figure 2:
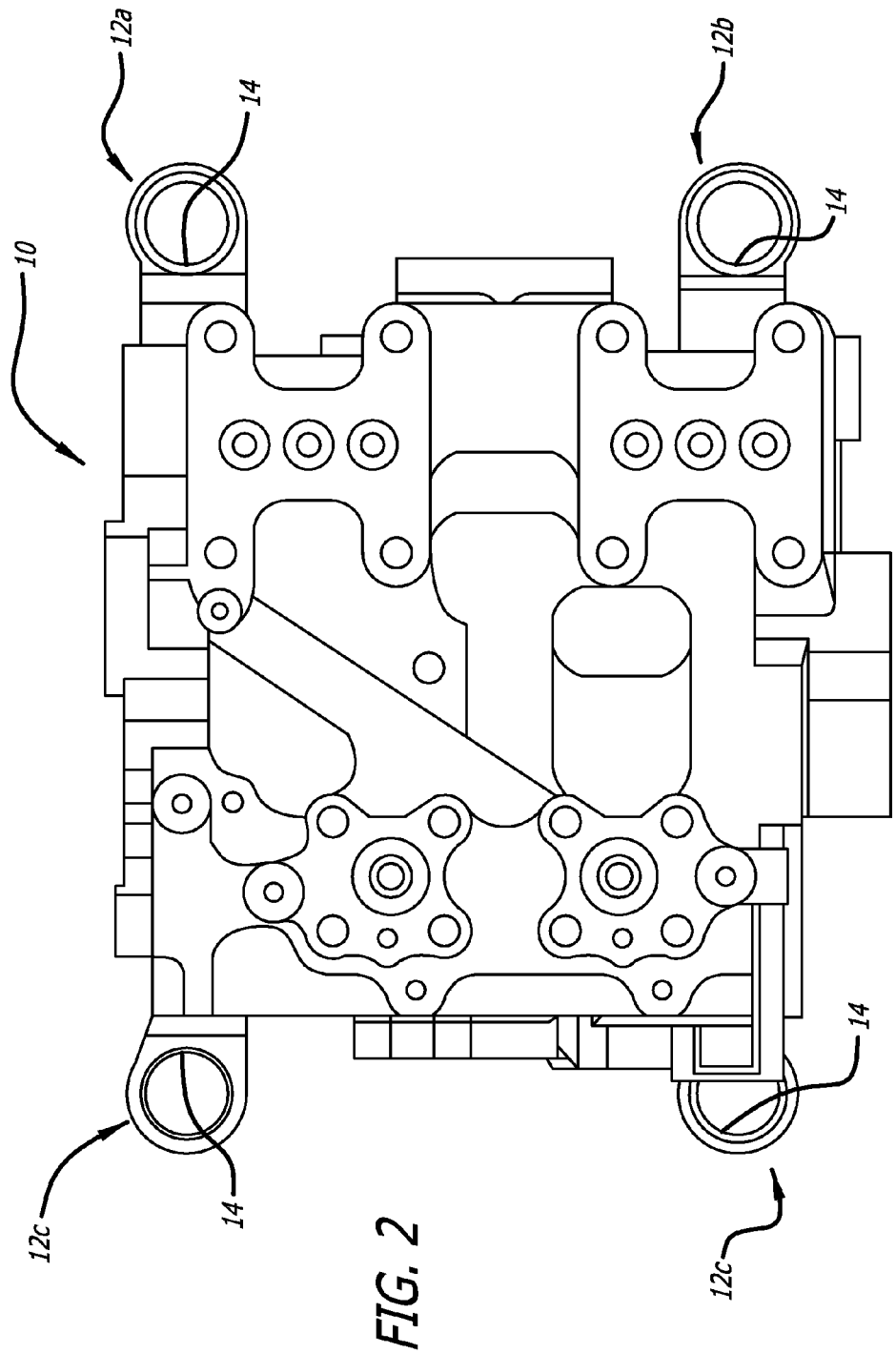
FIG. 2 is a top plan view of the aircraft brake control valve manifold of FIG. 1 with portions of the aircraft brake control valve manifold and shock and vibration isolators removed for clarity, showing the interior portions of the mounting feet of the aircraft brake control valve manifold, according to the present invention.

Referring to the drawings, which are provided by way of example for purposes of illustration, and which are not intended to limit the scope of the invention, the present invention provides for an aircraft brake control valve manifold 10 including a plurality of mounting feet, such as four mounting feet 12a,b,c,d, for example, configured to be rigidly or hard mounted to a structural part of an aircraft (not shown), such as by bolts or other type of fasteners, for example. Each of the plurality of mounting feet typically has a generally cylindrical central mounting aperture 14 configured to receive and retain a shock and vibration isolator 16. The shock and vibration isolator advantageously has a natural frequency selected to protect components of an aircraft brake control valve from random vibration and to avoid gun fire sinusoidal frequencies that can otherwise damage sensitive components of the brake control valve. In a presently preferred aspect, the natural frequency of the shock and vibration isolators is predetermined to be in a range to protect a sensitive flapper nozzle of the aircraft brake control valve from random vibration and to avoid gun fire sinusoidal frequencies, and is preferably above or below the natural frequency range of the flapper nozzle of the brake control valve, such as above or below 300 to 500 Hz, for example. As is illustrated in FIGS. 3 and 4, each shock and vibration isolator has a central aperture 24 configured to receive a fastener such as a bolt for hard mounting of the mounting feet of the brake control valve manifold to a structural part of the aircraft.

In a presently preferred aspect, each shock and vibration isolator includes an inner generally spool shaped silicone rubber insert portion 18 having a first tubular or annular end portion 20 and a second tubular or annular end portion 22 having a first diameter $D_1$ and a narrower middle portion 23 having a second diameter $D_2$ smaller than the first diameter, between the first and second tubular ends. The generally spool shaped silicone rubber insert portion defines the central aperture 24 therethrough for receiving a fastener such as a bolt for hard mounting of the mounting feet of the brake control valve manifold to a structural part of the aircraft. A first generally tubular or annular outer sheath member or jacket 26 is secured about the first tubular end of the silicone rubber tubular insert portion, and a second generally tubular or annular outer sheath member or jacket 28 is secured about the second tubular end of the silicone rubber tubular insert portion. The first and second generally tubular or annular outer sheath members are typically made of a rigid material such as a metal such as stainless steel, for example, for providing rigidity to the hard mounting, particularly when a bolt or other type of fastener is placed through the shock and vibration isolator and is tightened over the silicone rubber tubular insert portion of the shock and vibration isolator. The first and second generally tubular or annular outer sheath members are preferably spaced apart by a gap 30, which further permits the silicone rubber tubular insert portion to expand radially outwardly through the gap between the first and second generally tubular or annular outer sheath members as the bolt or other type of fastener is tightened in hard mounting of the mounting feet of the brake control valve manifold to a structural part or framework of the aircraft. The inner bore of the second generally tubular or annular outer sheath member may include a flange or shoulder 32 extending a short distance over exterior surface of the narrower middle portion 23 of the silicone rubber insert portion.

The radially outward expansion of the silicone rubber tubular insert portion is limited by the first and second generally tubular or annular outer sheath members, and the mounting apertures of the mounting feet of the aircraft brake control valve manifold. The outer diameter of the silicone rubber tubular insert portion is dimensioned such that a bolt or other type of fastener placed through the central aperture of the silicone rubber tubular insert portion will be spaced apart from the first and second generally tubular or annular outer sheath members, so that vibrations transmitted through the bolt or other type of fastener from the aircraft structural part or framework will not be transmitted directly to the first and second generally tubular or annular outer sheath members. By this hard mounting configuration, vibrations transmitted through the bolt or other type of fastener from the aircraft structural part or framework can only be transmitted through the silicone rubber tubular insert portions, and are damped due to the pre-selected, predetermined natural frequency of the shock and vibration isolators.

The brake control valve shock and vibration isolation mounting system of the invention was tested in shock and random vibration environments, and was able to survive the full qualification duration without any measurable degradation of the flapper nozzle interface.

It will be apparent from the foregoing that while particular forms of the invention have been illustrated and described, various modifications can be made without departing from the spirit and scope of the invention. Accordingly, it is not intended that the invention be limited, except as by the appended claims.

I claim:

1. A shock and vibration isolation mounting system for hard mounting an aircraft brake control valve to a structural part of an aircraft, comprising:
    an aircraft brake control valve manifold, said manifold including a plurality of mounting feet configured to be hard mounted to a structural part of an aircraft, each of said plurality of mounting feet having a central mounting aperture configured to receive and retain a shock and vibration isolator;
    a shock and vibration isolator disposed in each said central aperture of each of said plurality of mounting feet, each said shock and vibration isolator having a natural frequency selected to protect components of the aircraft brake control valve from damage from shock and vibration.

2. The shock and vibration isolation mounting system of claim 1, wherein the natural frequency of each said shock and vibration isolator is predetermined to be in a range to protect a flapper nozzle of a brake control valve from random vibration and to avoid gun fire sinusoidal frequencies.

3. The shock and vibration isolation mounting system of claim 1, wherein each said shock and vibration isolator includes a central aperture configured to receive a fastener for hard mounting of the mounting feet of the brake control valve manifold to a structural part of the aircraft.

4. The shock and vibration isolation mounting system of claim 1, wherein each said shock and vibration isolator comprise a generally spool shaped silicone rubber insert portion having a first tubular end portion, a second tubular end portion, and a narrower middle portion between said first and second tubular end portions, said first and second tubular end portions having a first diameter, said narrower middle portion having a second diameter smaller than said first diameter, a first generally tubular outer sheath member secured about the first tubular end of the silicone rubber tubular insert portion, and a second generally tubular outer sheath member secured about the second tubular end of the silicone rubber tubular insert portion.

5. The shock and vibration isolation mounting system of claim 4, wherein said generally spool shaped silicone rubber insert portion defining a central aperture therethrough configured to receive a fastener for hard mounting of the mounting feet of the brake control valve manifold to a structural part of the aircraft.

6. The shock and vibration isolation mounting system of claim 4, wherein said first and second generally tubular outer sheath members are spaced apart by a gap.

7. The shock and vibration isolation mounting system of claim 4, wherein said silicone rubber tubular insert portion has an outer diameter that is dimensioned such that a fastener placed through the central aperture of the silicone rubber tubular insert portion will be spaced apart from the first and second generally tubular outer sheath members.

8. The shock and vibration isolation mounting system of claim 1, wherein the natural frequency of the shock and vibration isolators is predetermined to be below 300 Hz or above 500 Hz.

9. A shock and vibration isolation mounting system for hard mounting an aircraft brake control valve to a structural part of an aircraft, the aircraft brake control valve including a flapper nozzle having a natural frequency of vibration, the shock and vibration isolation mounting system comprising:
    an aircraft brake control valve manifold, said manifold including a plurality of mounting feet configured to be hard mounted to a structural part of an aircraft, each of said plurality of mounting feet having a central mounting aperture configured to receive and retain a shock and vibration isolator;
    a shock and vibration isolator disposed in each said central aperture of each of said plurality of mounting feet, each said shock and vibration isolator including a generally spool shaped silicone rubber insert portion having a first tubular end portion, a second tubular end portion, and a narrower middle portion between said first and second tubular end portions, said first and second tubular end portions having a first diameter, said narrower middle portion having a second diameter smaller than said first diameter, a first generally tubular outer sheath member secured about the first tubular end of the silicone rubber tubular insert portion, and a second generally tubular outer sheath member secured about the second tubular end of the silicone rubber tubular insert portion, each said generally spool shaped silicone rubber insert portion including a central aperture therethrough configured to receive a fastener for hard mounting of the mounting feet of the brake control valve manifold to a structural part of the aircraft, and each said shock and vibration isolator having a natural frequency selected to protect components of the aircraft brake control valve from damage from shock and vibration.

10. The shock and vibration isolation mounting system of claim 9, wherein the natural frequency of each said shock and vibration isolator is predetermined to be in a range to protect a flapper nozzle of a brake control valve from random vibration and to avoid gun fire sinusoidal frequencies.

11. The shock and vibration isolation mounting system of claim 9, wherein said first and second generally tubular outer sheath members are spaced apart by a gap.

12. The shock and vibration isolation mounting system of claim 9, wherein said silicone rubber tubular insert portion has an outer diameter that is dimensioned such that a fastener placed through the central aperture of the silicone rubber tubular insert portion will be spaced apart from the first and second generally tubular outer sheath members.

13. The shock and vibration isolation mounting system of claim 9, wherein the natural frequency of the shock and vibration isolators is predetermined to be below 300 Hz or above 500 Hz.

* * * * *